Dec. 24, 1940.  J. KOLBE  2,226,435

VEHICLE LINK SPRING SUSPENSION MEANS FOR CURVE COMPENSATION

Original Filed July 24, 1936   2 Sheets-Sheet 1

INVENTOR
Joachim Kolbe.
BY Pike Calver & Gray.
ATTORNEYS.

Dec. 24, 1940.  J. KOLBE  2,226,435
VEHICLE LINK SPRING SUSPENSION MEANS FOR CURVE COMPENSATION
Original Filed July 24, 1936   2 Sheets-Sheet 2
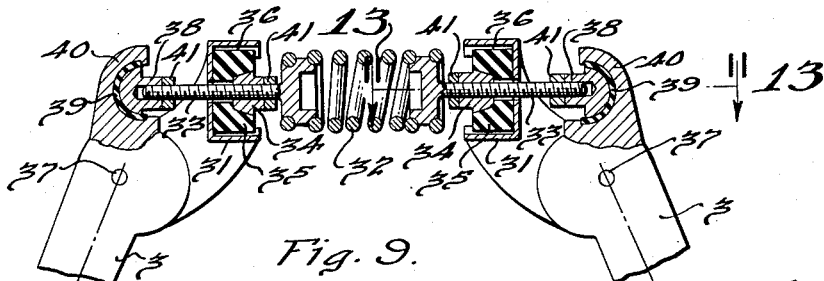
Fig. 9.
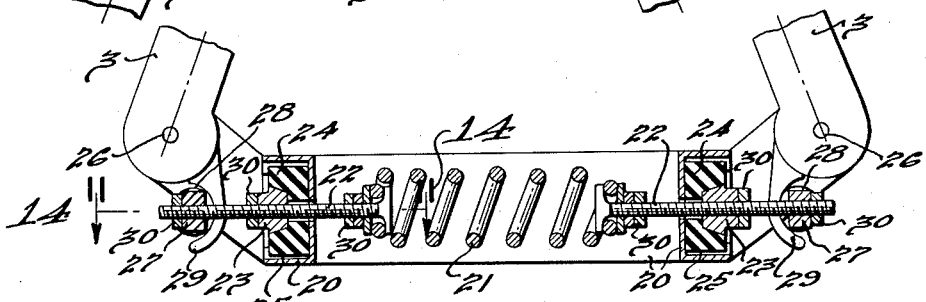
Fig. 10.
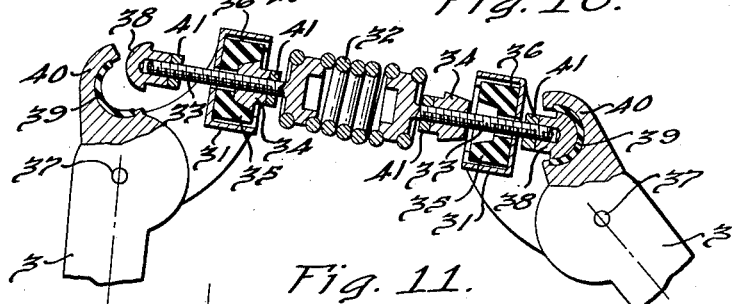
Fig. 11.
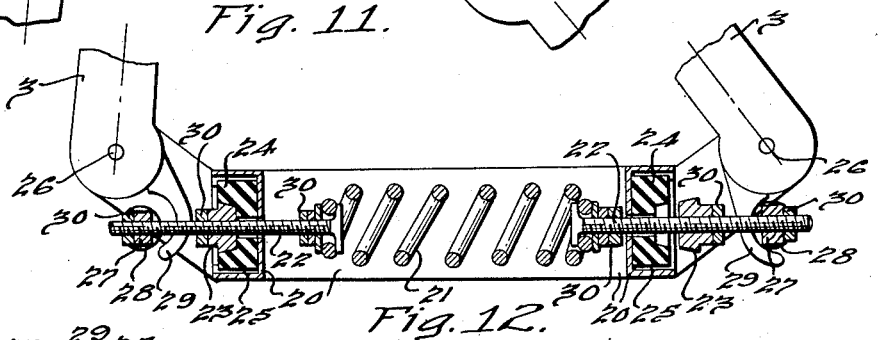
Fig. 12.
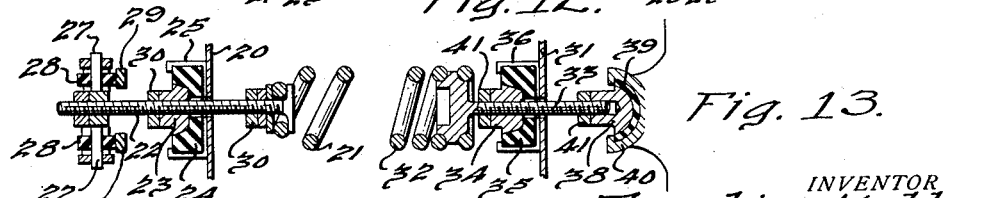
Fig. 13.
Fig. 14.
INVENTOR
Joachim Kolbe.
BY
*Pike Calver & Gray*
ATTORNEYS.

Patented Dec. 24, 1940

2,226,435

UNITED STATES PATENT OFFICE 2,226,435

VEHICLE LINK SPRING SUSPENSION MEANS FOR CURVE COMPENSATION

Joachim Kolbe, Detroit, Mich.

Application July 24, 1936, Serial No. 92,445
Renewed May 29, 1940
In Germany July 25, 1935

15 Claims. (Cl. 280—124)

This invention relates to vehicles wherein the superstructure may assume an inclined position under the influence of centrifugal force, and more particularly to improved resilient means to return the superstructure to the normal or upright position.

The invention relates to motor vehicles in which, in order that the centrifugal force which occurs when travelling on curves may not be noticed by passengers in the vehicle, the carriage body or superstructure instead of being rigidly connected to the chassis is supported on inclined links which are hingedly connected at one end to the wheel supporting means or axles or to the chassis, and at the other end to the superstructure or body of the vehicle, the connections of the links to the superstructure or body being at a less distance apart than on the wheel supporting means or chassis. On the occurrence of lateral forces, as when the vehicle rounds a curve, the body will consequently assume an inclined position, the inclined links pivoting about their hinged connections. With this movement of the body or superstructure to an inclined position, the centre of gravity of the body will in general move slightly in a downward direction. Spring or other resilient means may be provided to enable the carriage body, after having been tilted, to be brought back again into the normal or upright position. Such spring or resilient means may for example, be formed by rubber springs arranged to be stressed in torsion, and may be associated preferably with the hinged connections of the links.

With the above construction of link suspension means the vehicle body or superstructure is moved into an inclined position relatively to the wheel supporting means, axles or chassis, not only under the influence of lateral (e. g. centrifugal) forces, but also by vertical forces such as arise by a person getting into or out of the vehicle or with a one-sided loading of the vehicle.

The object of the present invention is to provide improvements in the construction of the link spring suspension system whereby the above forces, which in general are smaller than the horizontal forces produced by centrifugal force or the like, are absorbed.

According to the invention, a vehicle link spring suspension system for curve compensation is provided with a spring system the whole or a part of which is given an initial tension which is sufficient to counteract the influence of forces up to a predetermined magnitude, such as the vertical forces above referred to, which tend to displace the vehicle body from the normal position thereof relatively to the wheel axles or chassis.

In general it will be sufficient to give only a portion of the spring system an initial tension. In particular with the use of the above-mentioned rubber springs which are stressed in torsion, it will generally be sufficient to give an initial tension to only one or some of the rubber rings generally used. The resilient means may be preferably rigidly connected both with the chassis or the wheel axle and with the inclined links, or the resilient means may be constructed in such a manner that it or they can be given an initial tension. Preferably the construction is such that each link is only subjected to the action of the initial spring tension when tending to move in one direction and can move in the other direction uninfluenced by the initial tension of the resilient means.

In order that the invention may be clearly understood, various embodiments thereof are described hereinafter, by way of example, with reference to the accompanying drawings, in which:

Figure 9 is a part sectional view which illustrates a further embodiment of the invention with the vehicle body or superstructure in the normal position relatively to the wheel axles and chassis;

Figure 10 is a view similar to Figure 9 illustrating a further modified form of the invention;

Figure 11 is a view similar to Figure 9 showing the device in an operated position;

Figure 12 is a view similar to Figure 10 showing the device in an operated position;

Figure 13 is a sectional view taken substantially on the line 13—13 of Figure 9; and Figure 14 is a sectional view taken substantially on the line 14—14 of Figure 10.

Figure 1:
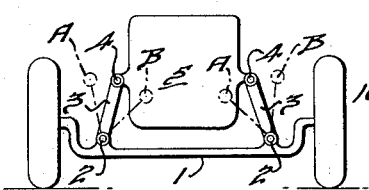
Figure 1 shows diagrammatically a front view of a vehicle provided with a curve compensating link-suspension system.

In the curve compensating link suspension system for vehicles according to Figure 1, pairs of links 3 are connected on to the front and rear wheel supporting means or axles, by hinged joints 2 the upper ends of which links are connected by hinged joints 4 to the superstructure or body 5 to the vehicle.

Under the influence of lateral and vertical forces, the superstructure or body 5 will, in the manner stated above, take up an inclined position proportionate to the forces exerted, and when the forces cease will return into the normal position if under the influence of suitable springs. In the example shown in Figure 2, these springs are shown as consisting of rubber discs 6 which are stressed in torsion and the external edges of which are connected with the links 3, whilst the internal edges thereof are firmly connected to an hexagonal rod 7 in turn rigidly connected by a yoke 8 with the chassis or wheel supporting means of the vehicle. The hinged joints 2 of Figure 1 are provided with spring or resilient means so that the body or superstructure 5 can be returned into the normal position.

Figure 7:
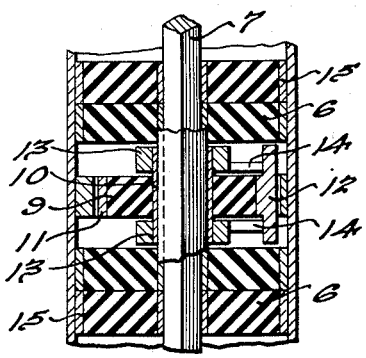
Figure 7 is a longitudinal section of the device shown in Figure 4.

As more clearly illustrated in Figure 7, one of the spring rings 6 on each side of the superstructure (although if required the following could apply to more than one such ring) is of special construction so as to provide an initial tensioning of the spring which is large enough to prevent a movement of the links about their hinged connections under the influence of vertical forces (or also of lateral horizontal forces of small magnitude).

In the embodiment according to Figure 7, the special construction of the rubber spring system consists in the provision in the center of the rubber rings 6 of a special ring 9, the inner edge of which is fastened to an hexagonal sleeve ring 10 having a greater length than the width of the rubber ring 9 so that the sleeve ring 10 projects by a small amount at each side of the rubber ring 9. The outer edge of the rubber ring 9 is firmly connected to a ring 11 which can be made round and is of substantially the same width as the rubber ring 9.

One portion of the outer ring 11 is enlarged into a projection 12 which is as long or approximately as long as the inner sleeve ring 10. On the inner hexagonal sleeve ring 10 are mounted, on both sides of the rubber ring 9, stop members 13 which consist of rings having an hexagonal bore and a radially extending projection 14 which projects so far from the central axis of the hexagonal rod 7 that it extends beyond the outer periphery of the ring 11 but does not extend beyond the projection 12 of the said ring. The projections 14 carried by the stop members 13 engage the projections 12 carried by the ring 11 to impart an initial stress to the resilient ring 9 when the superstructure is in the normal upright position.

Figure 8:
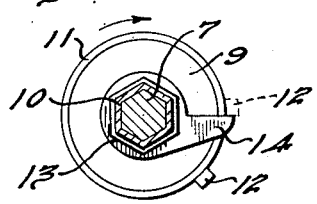
Figure 8 is an end view which shows in detail the construction of the initially tensioned ring.

The relationship of the parts 9, 10, 11 and 12, on the one hand, and of the parts 13 and 14 on the other hand, when the stop members 13 are tightened on the inner sleeve ring 10 is such as to produce an initial tensioning of the spring in accordance with the invention, as will be clearly seen from Figure 8.

Figures 2, 3:
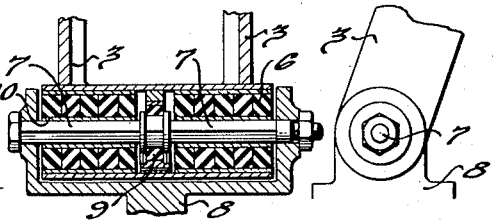
Figure 2 is a sectional view of a rubber spring link-suspension system.
Figure 3 is a side view thereof.
Figure 4:
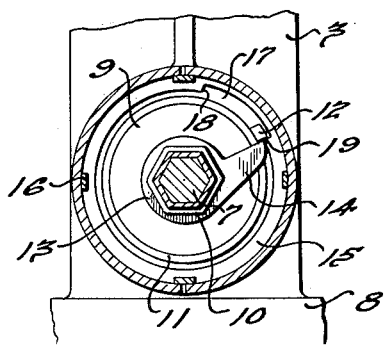
Figure 4 shows on a larger scale a vertical cross-section through a spring suspension system on the right side of the vehicle illustrated in Figure 1, at the point of initial tension, the suspension system being in the normal position.
Figure 5:
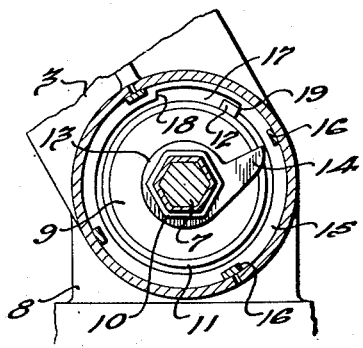
Figure 5 is a view similar to Figure 4, but after a movement of the link in a direction which increases the tension of the spring.
Figure 6:
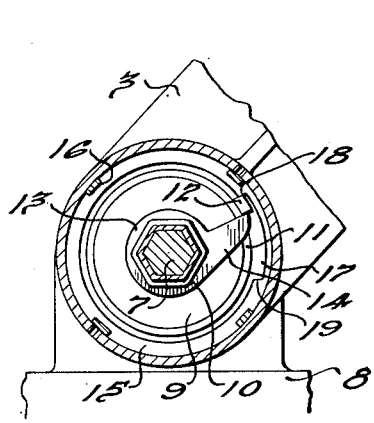
Figure 6 is a view similar to Figure 4, but after a movement of the link in a direction which decreases the tension of the spring so that the link is not acted on by spring tension.

By rotating the outer ring 11 in the direction of the arrow in Figure 8, the projection 12 carried by the outer ring 11 engages with the rear of the projection 14 carried by the stop member 13, as shown in dotted lines. In this way the rubber ring 9, which is held fast and unrotatable on the hexagonal rod 7 by the inner sleeve 10, is given an initial tension, and the stop members 13, which are also non-rotatable on the rod 7, prevent a backward rotation. As illustrated in Figures 2 and 7 such an initially tensioned spring ring is mounted in approximately the middle of the sleeve 15 connected with the link 3, on the hexagonal rod 7. If necessary, more than one such initially tensioned ring may be used. The sleeve 15 is non-rotatably connected with the link 3 by splines or otherwise as by a groove and key 16 as illustrated in Figures 4, 5 and 6. The inner surface of the sleeve 15 is provided over a portion of the circumferential length thereof, with a recess 17 which is sufficiently deep to permit a movement of the sleeve 15 over the projection 12 of the ring 11.

By means of the recess 17 two spaced shoulders 18 and 19 are also formed in the sleeve 15 which act in the following manner: In the normal position of the link suspension system shown in Figure 4, the projection 12 of the outer ring 11 of the initially tensioned rubber ring 9 bears both against the shoulder 19 of the sleeve 15 and against the projection 14 of the stop member 13. If now the link 3 moves out of the normal position shown in Figure 4, into the position shown in Figure 5, the sleeve 15 will also rotate in the same direction, that is to say, in counterclockwise direction and as shown will, through the shoulder 19 of the sleeve 15 forming one end of the recess 17, carry along the projection 12 of the ring 11, and thus further increase the tension of the spring. The result is thus attained that with movements in the direction described, the forces tending to displace the superstructure or body must be sufficiently large to overcome the initial tension of the spring, and if the said forces are not sufficiently strong to accomplish this, the links 3 and with them the superstructure or body will be held fast in the normal or upright position. With movements of the link 3 in the opposite direction, into the position shown in Figure 6, the projection 12 of the initially tensioned rubber ring 9 bears against the projection 14 of the stop member 13, whilst the outer sleeve 15 in consequence of the recess 17 therein, can rotate freely to a certain extent without being in any way influenced by the initial tensioning of the spring. Only the usual forces of the other springs which have not been initially tensioned, have then to be overcome. The recess 17 in the sleeve 15 must of course be made long enough circumferentially to ensure that with the movement of the link 3 in the direction shown in Figure 6, the shoulder 18 of the recess 17 formed in the sleeve 15 does not engage the projection 12 until the link 3 has moved a predetermined amount.

As long, therefore, as the magnitude of the vertical or horizontal operating forces is not sufficiently great to overcome the initial tension of the springs, the resilient or spring means will prevent any movement of the superstructure or body relative to the links.

The operation of the device illustrated in Figures 1 to 8 may be briefly summarized as follows. The resilient ring 9 has imparted thereto any desired initial tension when the superstructure 5 is in the normal or upright position as illustrated in Figures 1 and 4, through the radially extending projections 14 carried by the rods 7 which engage the radially extending stop members 12 carried by the ring 11 which is fixed to the resilient ring 9. When the superstructure 5 assumes a banked position under the influence of lateral or vertical forces of a predetermined magnitude, as by rounding a corner to the left, the links 3 move in the counterclockwise direction toward the position A—A of Figure 1, as illustrated in Figure 5. The stop members 12 and the ring 11 fixed to the resilient ring 9 are rotated in a counterclockwise direction by the shoulder 19 of the recess 17 formed in the sleeve 15 which moves with the link 3. The tension of the resilient ring 9 is thereby increased to exert an increased force tending to return the right hand link 3 and the superstructure 5 toward the normal or upright position, and the auxiliary resilient rings 6, associated with each of the links 3, also have tension imparted to them to urge the links 3 and the superstructure 5 back toward the normal position as illustrated in Figure 1. During this movement, however, the resilient ring 9 of the left hand assembly is released and does not exert any force on the left hand link since it is released, and operates in the same manner as the resilient means 9 of the right hand assembly when the superstructure moves in the opposite direction or toward the position B—B of Figure 1, as discussed below.

If now the superstructure assumes a banked position in the opposite direction whereby the links 3 move in a clockwise direction toward the position B—B of Figure 1 as illustrated in Figure 6, the stop members 12 and the ring 11 fixed to the resilient ring 9 are held in the same relative position by the radially extending projections 14 carried by the rods 7, and the sleeve 15 rotates in the clockwise direction, the stop members 12 moving in the recess 17. The resilient ring 9 is therefore disengaged and does not exert any force as the right hand link moves outwardly as when the superstructure assumes a banked position while rounding a curve to the right.

Attention is called to the fact that when the superstructure 5 is moved to a banked position under the influence of forces sufficient to overcome the initial tension of the resilient means, the force exerted by one of the initially tensioned resilient means is increased while the force of the other initially tensioned resilient means is released altogether and does not exert any force tending to return the superstructure to the normal position.

A similar result may also be obtained by means of other constructions of spring systems, two further embodiments of which are illustrated by way of example in Figures 9 to 14, spiral springs being used in both cases.

With reference to Figures 9 and 10, the inclined links which connect the wheel supporting means or chassis with the superstructure or body of the vehicle are shown at 3. The spring system may be arranged at the bottom of the link system, between the links as illustrated in Figure 10, or in some other position, e. g., at the top of the system between the links as illustrated in Figure 9. Both constructional possibilities are shown in the embodiments according to Figures 9 and 10, although it is only necessary to use one of these systems.

The spring system shown at the bottom of the link suspension system in Figure 10, is mounted between the walls of the wheel supporting means or axle box 20 and comprises a tension spring 21 which, by means of draw rods 22 and conical nuts 23, can have an initial tension imparted thereto of any desired magnitude. The conical nuts 23 are mounted in rubber bearings 24 carried in box-like thrust bearings 25 secured to the axle box walls 20. Over the ends of the draw rods 22 are screwed, below the link joints 26, cross bearing members 27, the bearing surfaces of which are provided with rubber rings 28 and are engaged by hooks 29. The cross bearing members 27, the conical nuts 23 and the connecting plates of the draw rods 22 with the tension springs 21 are mounted in position, once fixed, by lock nuts 30.

If now a lateral or vertical force acts on the vehicle, the link system will be displaced into an inclined position as shown in Figure 12 if this force—taking into consideration the correspondingly effective leverage—is greater than the initial tensioning given to the tension spring 21 by means of the conical nut 23. The right-hand link 3, which pivots inwardly, operates by means of its hook 29 to draw the cross bearing member 27, and with it also the draw rod 22 and conical nut 23, outwards and to thus tension still further the spring 21. The left-hand link 3 which pivots upwards removes its hook 29 from engagement with the corresponding cross bearing member 27 so that the corresponding draw rod 22 and conical nut will not alter their positions and the spring 21 will retain on this side its rigid support. Whereas therefore, the strength of the tension spring 21 determines or helps to determine the extent of the movement of the carriage body into the various inclined positions, the degree thereof is fixed by the initial tensioning of the tension spring 21 above which the link trapezoid is able to come into operation. The magnitude of the initial tensioning of the spring 21 can be adjusted as desired.

In another embodiment of spring system as shown in Figure 9, the spring is arranged at the top of the link system between the links 3. To this end compression springs 32 may be mounted between bracket arms of the superstructure or body frame 31. The springs 32 may have imparted thereto any desired initial tension by means of threaded compression rods 33 and conical nuts 34. The conical nuts 34 may be mounted in rubber bearings 35 arranged in box-like thrust bearings 36 bolted or otherwise secured to the bracket arms of the superstructure or body frame 31.

Over the ends of the thrust rods 33 are screwed above the upper link joints 37 buffer cushions 38 over which fit thrust blocks 40 lined with bushings 39 of rubber. The buffer cushions 38 and the conical nuts 34 are secured in position, by lock nuts 41. If now a lateral force acts on the link trapezoid, it must be greater, taking into consideration the corresponding leverage or offset relative to the upper and lower connections of the links, than the initial spring tension in order to be able to displace the link system and thereby the superstructure or body into an inclined position. In this case as illustrated in Figure 11, the righthand link 3, which pivots inwards, exerts an increasing inwardly directed pressure through its thrust block 40 on the corresponding compression rod 33 and conical nut 34, and the compression spring 32 is compressed still more, whilst the thrust block 40 of the left-hand link 3 which is moving outwardly is released from the buffer cushion 38, with the result that the corresponding compression rod 33 and conical nut 34 remain in their original position and give the compression spring 32 the desired rigid support from that side.

The devices as illustrated in Figures 9 to 14 operate in a manner similar in many respects to the device illustrated in Figures 1 to 8.

In the embodiment illustrated in Figures 9 and 11, the spring 32 exerts a force through the thrust rods 33 and buffer cushions 38 to the thrust blocks 40 carried by the links 3 to maintain the links in proper spaced relation to hold the superstructure 5 in the normal or generally upright position. The associated parts are so related that a predetermined initial tension is imparted to the spring 32 sufficient to maintain the superstructure in the normal or generally upright position until subjected to lateral or vertical forces of a predetermined magnitude.

When the superstructure is subjected to forces which are sufficient to overcome the initial tension of the spring 32, as when the vehicle rounds a curve, the links 3 pivot transversely of the vehicle and the superstructure 5 assumes an inclined or banked position under the influence of centrifugal force. If the vehicle rounds a curve to the left the links 3 rotate about their connections transversely of the vehicle as illustrated in Figure 11, and the thrust block 40 carried by the left link 3 (right side of Figure 11) operates through the buffer cushion 38 and the thrust rod 33 associated therewith to compress the spring 32. During this movement of the superstructure to the banked position the thrust block 40 carried by the right link 3 (left side of Figure 11) moves outwardly, thereby disengaging the left buffer cushion 38 so that no force is exerted on the left link 3. However, the right thrust rod 33 (left side of Figure 11) is held against transverse outward movement relative to the superstructure by the conical nut 34 which is held by the thrust bearing 36 carried by the superstructure so that the force of the spring 32 may be exerted on the left hand thrust block 40 of the left link 3 (right side of Figure 11). As the superstructure assumes a banked position, the force exerted on one of the links to return the superstructure to the normal position is increased while the force on the other link is released altogether.

The embodiment illustrated in Figures 10 and 12 operates in a manner generally similar to that of Figures 9 and 11, the hook 29 carried by the left link 3 (right side of Figure 12) operating through the rod 22 to tension the spring 21 as the superstructure moves to the banked position, and the hook 29 carried by the right link 3 (left side of Figure 12) releasing the member 28, whereupon the rod 22 and the end of the spring 21 will be held against transverse movement relative to the superstructure by the resilient bearing 24 at the right side (left side of Figure 12). As the superstructure moves to a banked position the resilient force acting on the left hand link 3 (right side of Figure 12) progressively increases, while no force at all is exerted by the spring 21 on the right hand link 3 (left side of Figure 12).

When the superstructure moves to a banked position in the opposite direction, as when the vehicle rounds a curve to the right, the operation of the resilient means and the actuating means described above is reversed.

The tension springs can also be correspondingly arranged at the top and the compression springs at the bottom of the link system when the construction is to be such that the rising link, i. e., the outwardly pivoting link, has to operate to increase the tension.

Also, instead of spiral springs, rubber, air or liquid springs can be provided and finally it is also possible to provide small angle iron pendants between rods and corresponding link joints and flexible connections (such as of leather) so that any loosening and knocking of individual elements of the construction are prevented without departing from the basic feature of the initial spring tension for the link suspension system.

I claim:

1. In a vehicle link spring suspension means for curve compensation, wherein a vehicle body is connected to a chassis by link members having their upper ends closer together than the lower ends, and wherein the vehicle body is adapted to assume an inclined banking position when traveling over road curves, initially tensioned spring devices associated with the link members and having an initial tension imparted thereto to counteract the action of forces of a predetermined magnitude which tend to displace the vehicle body from a normal upright position when at rest and traveling in straight paths whereby the spring devices at one side of the vehicle are influenced by the associated link member when the vehicle body tilts in one direction, abutments on the spring devices, means on each link member engaged by an abutment device, the inward movement of a link member causing said means to displace the associated abutment and increase the tension of the spring device while the corresponding means of the cooperating link member is disengaged from the associated abutment.

2. In a vehicle link spring suspension means for curve compensation, wherein a vehicle body is connected to a chassis by link members having their upper ends closer together than the lower ends, and wherein the vehicle body is adapted to assume an inclined banking position when traveling over road curves, spring devices associated with the link members and having an initial tension imparted thereto to counteract the action of forces of a predetermined magnitude which tend to displace the vehicle body from a normal upright position when at rest and traveling in straight paths, the spring devices including a rubber spring element associated with a link pivot and in the form of at least one rubber ring stressed in torsion to provide an initial tension thereto, the inner side of the ring being non-rotatably connected to a link member, a stop member connected to said link member, a radial projection on the ring, movement of the link member in one direction causing the stop member to engage and move the radial projection and ring to increase the initial tensioning of the spring while movement of the link member in the other direction is free from influence of the initial tension of the spring.

3. In a vehicle link spring suspension means for curve compensation, wherein a vehicle body is connected to a chassis by link members having their upper ends closer together than the lower ends, and wherein the vehicle body is adapted to assume an inclined banking position when traveling over road curves, spring devices associated with the link members and having an initial tension imparted thereto to counteract the action of forces of a predetermined magnitude which tend to displace the vehicle body from a normal upright position when at rest and traveling in straight paths, the initially tensioned spring devices being associated with the link member in a manner whereby the spring devices at one side of the vehicle body are influenced by the associated link members when the vehicle body tilts in one direction, and means carried by the vehicle body and chassis for supporting each end of the spring devices and constructed and arranged to permit movement of the ends of the spring devices relative to their supporting means.

4. In a vehicle link spring suspension means for curve compensation, wherein a vehicle body is connected to a chassis by link members having their upper ends closer together than the lower ends, and wherein the vehicle body is adapted to assume an inclined banking position when traveling over road curves, spring devices associated with the link members and having an initial tension imparted thereto to counteract the action of forces of a predetermined magnitude which tend to displace the vehicle body from a normal upright position when at rest and traveling in straight paths, the initially tensioned spring devices being associated with the link members in a manner whereby the spring devices at one side of the vehicle body are influenced by the associated link member when the vehicle body tilts in one direction, a supporting member attached to each end of the spring devices, a bracket arm on each link member engaged by a supporting member, the inward movement of a link member causing the bracket arm thereof to displace the associated supporting member and increase the tension of the spring device while the bracket arm of the cooperating link member is disengaged from the associated supporting member.

5. In a vehicle link spring suspension means for curve compensation, wherein a vehicle body is connected to a chassis by link members having their upper ends closer together than the lower ends, and wherein the vehicle body is adapted to assume an inclined banking position when traveling over road curves, spring devices associated with the link members and having an initial tension imparted thereto to counteract the action of forces of a predetermined magnitude which tend to displace the vehicle body from a normal upright position when at rest and traveling in straight paths, the initially tensioned spring devices being associated with the link members in a manner whereby the spring devices at one side of the vehicle body are influenced by the associated link member when the vehicle body tilts in one direction, the connections between the spring devices and link members including threaded rods rigidly connected with the initially tensioned spring devices and adjustable lock nuts on the threaded rods arranged to bear against the vehicle body and chassis, and flexible connections between the threaded rods and link bracket arms adapted to be stressed during movements of the link members in one direction.

6. In a vehicle having wheel supporting means, a superstructure having a normal or generally upright position, connecting means comprising transversely spaced angularly inclined links interposed between the wheel supporting means and superstructure whereby the superstructure may assume an inclined or banked position when subjected to forces tending to displace it from the normal position, initially tensioned resilient means associated with each link to urge the superstructure toward the normal position, and means operable by movement of the superstructure to a banked position to increase the tension of one of the resilient means and to release the other of the resilient means.

7. In a vehicle having wheel supporting means, a superstructure having a normal or generally upright position, connecting means comprising transversely spaced angularly inclined links interposed between the wheel supporting means and superstructure whereby the superstructure may assume an inclined or banked position when subjected to forces tending to displace it from the normal position, initially tensioned resilient means associated with each link to urge the superstructure toward the normal position, auxiliary resilient means associated with each link to urge the superstructure towards the normal position when it is displaced therefrom, and means operable by movement of the superstructure to a banked position to increase the tension of one of the initially tensioned resilient means and to release the other of the initially tensioned resilient means, and to increase the tension of each of the auxiliary resilient means when the superstructure is subjected to forces of a sufficient magnitude to overcome the initially tensioned resilient means.

8. In a vehicle having wheel supporting means, a superstructure having a normal or generally upright position, connecting means interposed between the wheel supporting means and superstructure whereby the superstructure may assume an inclined or banked position when subjected to forces tending to displace it from the normal position, initially tensioned resilient means carried by the superstructure to exert forces on the connecting means to maintain the superstructure in the normal position until subjected to forces of a predetermined magnitude, and means operable by movement of the superstructure to a banked position to increase the force exerted by the resilient means on a portion of the connecting means and to release the force exerted on another portion of the connecting means.

9. In a vehicle having wheel supporting means, a superstructure having a normal or generally upright position, connecting means interposed between the wheel supporting means and superstructure whereby the superstructure may assume an inclined or banked position when subjected to forces tending to displace it from the normal position, initially tensioned resilient means carried by the wheel supporting means to exert forces on the connecting means to maintain the superstructure in the normal position until subjected to forces of a predetermined magnitude, and means operable by movement of the superstructure to a banked position to increase the force exerted by the resilient means on a portion of the connecting means and to release the force exerted on another portion of the connecting means.

10. In a vehicle having wheel supporting means, a superstructure having a normal or generally upright position, connecting means comprising transversely spaced angularly inclined link members interposed between the wheel supporting means and superstructure whereby the superstructure may assume an inclined or banked position when subjected to forces tending to displace it from the normal position, initially tensioned resilient means carried by the superstructure to exert forces on the link members to maintain the superstructure in the normal position until subjected to forces of a predetermined magnitude, and means operable by movement of the superstructure to a banked position to increase the force exerted by the resilient means on one of the link members and to release the force exerted on the other link member.

11. In a vehicle having wheel supporting means, a superstructure having a normal or generally upright position, connecting means comprising transversely spaced angularly inclined link members interposed between the wheel supporting means and superstructure whereby the superstructure may assume an inclined or banked position when subjected to forces tending to displace it from the normal position, initially tensioned resilient means carried by the wheel supporting means to exert forces on the link members to maintain the superstructure in the normal position until subjected to forces of a predetermined magnitude, and means operable by movement of the superstructure to a banked position to increase the force exerted by the resilient means on one of the link members and to release the force exerted on the other link member.

12. In a vehicle having wheel supporting means and a superstructure having a normal or generally upright position, connecting means between the wheel supporting means and superstructure whereby the superstructure may assume a banked position when subjected to lateral or vertical forces, initially tensioned resilient means operable when the superstructure is in the normal position to hold it in said position until subjected to forces of a predetermined magnitude, and means associated with the connecting means to interrupt the operation of the resilient means when the superstructure is subjected to lateral or vertical forces of a predetermined magnitude.

13. In a vehicle having wheel supporting means and a superstructure having a normal or generally upright position, transversely spaced connecting means between the wheel supporting means and superstructure whereby the superstructure may assume a banked position when subjected to lateral or vertical forces, transversely spaced initially tensioned resilient means associated with the connecting means and operable when the superstructure is in the normal position to hold it in said position until subjected to forces of a predetermined magnitude, and means operable by movement of the superstructure from the normal position to interrupt the operation of one of the transversely spaced resilient means and to increase the resistance of another of the transversely spaced resilient means.

14. A vehicle having front and rear wheel supporting means, a superstructure having a normal upright position, connecting means comprising paired angularly inclined links interconnecting the superstructure and the front and rear wheel supporting means whereby the superstructure may assume a banked position when subjected to centrifugal force accompanied by a transverse movement of the links to a different inclined position, resilient means associated with each link member and subjected to a predetermined tension to counteract forces of a predetermined magnitude which tend to displace the superstructure from the normal upright position, and means associated with the links to tension the resilient means upon inward movement of one of the links to a different inclined position and to release another of the resilient means upon outward movement of one of the links to a different inclined position accompanied by a movement of the superstructure to a banked position.

15. In a vehicle having wheel supporting means, a superstructure or body having a normal generally upright position, connecting means comprising transversely spaced angularly inclined link members interconnecting the wheel supporting means and superstructure whereby the superstructure may assume an inclined or banked positioned when subjected to lateral forces, initially tensioned resilient means urging the link members to position the superstructure in the normal position, and means operable to increase the force of the resilient means associated with one of the link members and to interrupt the force of the resilient means associated with the other link member as the superstructure moves from the normal upright position.

JOACHIM KOLBE.